United States Patent [19]

Garnish et al.

[11] 4,126,505

[45] Nov. 21, 1978

[54] ADHESIVE COMPOSITIONS

[75] Inventors: Edward W. Garnish, Saffron Walden; Robert G. Wilson, Cambridge, both of England

[73] Assignee: Ciba-Geigy Corporation, Ardsley, N.Y.

[21] Appl. No.: 736,290

[22] Filed: Oct. 28, 1976

Related U.S. Application Data

[63] Continuation of Ser. No. 521,224, Nov. 5, 1974, abandoned.

[51] Int. Cl.$^2$ .......................... C09J 3/16; C08L 63/00
[52] U.S. Cl. .................. 156/330; 260/830 S; 260/830 TW; 260/835; 260/836; 260/837 R
[58] Field of Search .................. 260/830 S, 836, 837, 260/835, 830 TW

[56] References Cited

U.S. PATENT DOCUMENTS

| | | | |
|---|---|---|---|
| 2,858,291 | 10/1958 | McAdam | 260/830 S |
| 3,144,422 | 8/1964 | Homberg | 260/837 R |
| 3,215,757 | 11/1965 | Scheibli | 260/830 S |
| 3,318,973 | 5/1967 | Hill | 260/837 |
| 3,383,434 | 5/1968 | Carlston | 260/835 |
| 3,629,362 | 12/1971 | Carlston | 260/835 |
| 3,637,618 | 1/1972 | May | 260/830 TW |
| 3,662,022 | 5/1972 | Lard | 260/836 |
| 3,676,283 | 7/1972 | Kehr | 260/836 |
| 3,700,645 | 10/1972 | Fukoka | 260/837 R |
| 3,746,685 | 7/1973 | Dobinson | 260/836 |
| 3,835,085 | 9/1974 | Wrzesinski | 260/836 |
| 3,839,494 | 10/1974 | Hickner | 260/830 TW |
| 3,876,723 | 4/1975 | Strecker | 260/837 R |
| 3,900,594 | 8/1975 | Guthrie | 260/837 R |
| 3,908,039 | 9/1975 | Guthrie | 260/837 R |

FOREIGN PATENT DOCUMENTS 1,245,340  9/1971  United Kingdom.

*Primary Examiner*—Paul Lieberman
*Attorney, Agent, or Firm*—Vincent J. Cavalieri

[57] ABSTRACT

Compositions, useful as adhesives, comprise
  (i) an epoxide resin having glycidyl, β-methylglycidyl, or 2,3-epoxycyclopentyl groups directly attached to oxygen, nitrogen, or sulfur atoms,
  (ii) as curing agent for the epoxide resin, either one of certain (cyclo)aliphatic amines or one of certain tertiary amines, and also
  (iii) a polymercaptan, and
  (iv) a polyene having at least two activated ethylenic double bonds, each β to an atom of oxygen, nitrogen, or sulfur, the sum of these double bonds and of the mercaptan groups in the polymercaptan being at least 5.

The compositions rapidly develop tack, so avoiding the need to hold, for a prolonged period in jigs, clamps, or other devices, objects being bonded together while the epoxide resin cures.

35 Claims, No Drawings

ADHESIVE COMPOSITIONS

This is a continuation of application Ser. No. 521,224, filed on Nov. 5, 1974, now abandoned.

This invention relates to new adhesive compositions, to methods of bonding surfaces together by means of these compositions, and to structures prepared by these methods.

The usefulness and versatility of epoxide resin adhesive compositions are well known. Such compositions are made up of two essential constituents, the epoxide resin (i.e., a substance containing more than one 1,2-epoxide group per average molecule) and a cataylst or curing agent which causes the epoxide resin to crosslink or itself reacts with the resin, these constituents reacting to form a cured product having a high specific adhesion to a wide variety of substrates. Particularly useful adhesives are those that cure at room temperatures, say, 20° C, or at moderate temperatures, say, at or below 60° C.

Most epoxide resin adhesive compositions hitherto available lack "green strength", that is to say, they are not tacky before they solidify, and surfaces to be bonded to each other by the adhesive must be held together by jigs, clips, presses, or other temporary fasteners whilst solidification takes place. Attempts have been made to overcome this disadvantage by dissolving certain high-molecular weight polymers in one or more components of the composition to act as a tackifier. In general, such compositions suffer from the drawback that the blend of the added polymer and the epoxide resin is viscous and becomes tacky too rapidly, leading to difficulties in mixing it with other constituents of the compositions or in applying it in a sufficiently thin layer. To counter this, volatile solvents could be incorporated, but the solvent-containing compositions cannot always be spread in layers of the desired thickness, the solvent may attack the object to be bonded, and many types of solvents introduce flammability or toxicity hazards into the workshop.

We have now found that the desired objective of producing an epoxide resin adhesive which can easily be mixed, dispensed, and spread, and which will become tacky in use, may be achieved, without the need to add a volatile solvent, by employing certain combinations of epoxide resins, polymercaptans, and polyenes with a curing agent for the epoxide resin. The curing agent may be one of certain aliphatic or cycloaliphatic polyamines which cure the epoxide resin by a crosslinking addition reaction, or it may be one of certain tertiary amines which cure the epoxide resin by catalytically-induced polymerisation.

The present invention accordingly provides a composition comprising (a) an epoxide resin having, per average molecule, more than one 1,2-epoxide group of formula

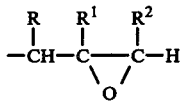

directly attached to oxygen, sulphur, or nitrogen, where either R and $R^2$ independently of one another represent hydrogen, in which case $R^1$ denotes hydrogen or methyl, or R and $R^2$ conjointly represent —$CH_2CH_2$—, in which case $R^1$ denotes hydrogen, (b) a polymercaptan having at least two mercaptan groups per average molecule, (c) a polyene having, per average molecule, at least two ethylenic double bonds, each β to an atom of oxygen, nitrogen, or sulphur, the sum of such ethylenic double bonds and of the mercaptan groups in (b) being more than 4, and preferably from 5 to 8, and (d) as curing agent for the epoxide resin, either a compound having at least three hydrogen atoms directly attached to aliphatic or cycloaliphatic amino nitrogen atoms or a tertiary amine having at least one nitrogen atom directly attached to carbon atoms of aliphatic or cycloaliphatic groups exclusively and at most two hydrogen atoms attached to amino nitrogen atoms.

This invention further provides a method for bonding surfaces together which comprises sandwiching between, and in contact with, the surfaces a curable composition of this invention, and also articles having surfaces bonded together by the aforesaid method.

A feature of this invention is that the compositions, presumably through the reaction of the polymercaptan (b) with the polyene (c), rapidly form a rubbery adhesive, which is sufficiently strong for many purposes, in an extremely short time (typically, in less than 1 hour and often in less than 15 minutes), which adhesive subsequently increases in strength, presumably due to reaction of the curing agent (d) with the epoxide resin (a), to give the high strength normally associated with epoxide resin adhesives.

In the usual methods of manufacturing epoxide resins, mixtures of compounds of differing molecular weight are obtained, these mixtures ordinarily containing a proportion of compounds whose epoxide groups have undergone partial hydrolysis. The average number of 1,2-epoxide groups per molecule of the resin need not be an integer of at least 2; it is generally a fractional number but must in any case be greater than 1.0.

Examples of resins which may be used are polyglycidyl and poly(β-methylglycidyl) esters obtainable by reaction of a substance containing two or more carboxylic acid groups with epichlorohydrin, glycerol dichlorohydrin, or β-methylepichlorohydrin in the presence of alkali. Such esters may be derived from aliphatic carboxylic acids, e.g., oxalic acid, succinic acid, adipic acid, sebacic acid, and dimerised or trimerised linoleic acid, from cycloaliphatic carboxylic acids such as hexahydrophthalic acid, 4-methylhexahydrophthalic acid, tetrahydrophthalic acid, and 4-methyltetrahydrophthalic acid, and from aromatic carboxylic acids such as phthalic acid, isophthalic acid, and terephthalic acid.

Other epoxide resins which may be used include polyglycidyl and poly(β-methylglycidyl) ethers, such as those obtainable by reaction of a substance containing at least two alcoholic hydroxyl groups or at least two phenolic hydroxyl groups with the appropriate epichlorohydrin or glycerol dichlorohydrin under alkaline conditions, or, alternatively, in the presence of an acidic catalyst with subsequent treatment with alkali. Such ethers may be derived from aliphatic alcohols, for example, ethylene glycol, diethylene glycol, triethylene glycol, and higher poly(oxyethylene) glycols, propylene glycol and poly(oxypropylene) glycols, propane-1,3-diol, butane-1,4-diol, pentane-1,5-diol, hexane-1,6-diol, hexane-1,2,6-triol, glycerol, 1,1,1-trimethylolpropane, and pentaerythritol; from cycloaliphatic alcohols such as quinitol, 1,1-bis(hydroxymethyl)cyclohex-3-ene, bis(4-hydroxycyclohexyl)methane, and 2,2-bis(4-hydroxycyclohexyl)propane; and from alcohols containing aromatic nuclei, such as N,N-bis(2-hydroxyethyl)aniline and 4,4-bis(2-hydroxyethylamino)diphenylmethane. Preferably the ethers are polyglycidyl ethers of an at least dihydric phenol, for example, resorcinol, catechol, hydroquinone, bis(4-hydroxyphenyl)methane, 1,1,2,2-tetrakis(4-hydroxyphenyl)ethane, 4,4'-dihydroxydiphenyl, bis(4-hydroxyphenyl) sulphone, and phenol-formaldehyde, alkylphenolformaldehyde, and chlorophenol-formaldehyde novolac resins, 2,2-bis(4-hydroxyphenyl)propane (otherwise known as bisphenol A), and 2,2-bis(3,5-dibromo-4-hydroxyphenyl)propane.

There may further be employed poly(N-glycidyl) and poly(N-$\beta$-methylglycidyl) compounds, for example, those obtained by dehydrochlorination of the reaction products of the epichlorohydrin and amines containing at least two hydrogen atoms directly attached to nitrogen, such as aniline, n-butylamine, bis(4-aminophenyl)methane, bis(4-aminophenyl) sulphone, and bis(4-methylaminophenyl)methane. Other poly(N-glycidyl) compounds that may be used include triglycidyl isocyanurate, N,N'-diglycidyl derivatives of cyclic alkylene ureas such as ethyleneurea and 1,3-propyleneurea, and N,N'-diglycidyl derivatives of hydantoins such as 5,5-dimethylhydantoin.

Compounds of formula I in which $R$ and $R^2$ conjointly represent —$CH_2CH_2$— and $R^1$ denotes hydrogen include bis(2,3-epoxycyclopentyl) ether, 2,3-epoxycyclopentyl glycidyl ether, and 1,2-bis(2',3'-epoxycyclopentyloxy)ethane.

Especially suitable epoxide resins are polyglycidyl ethers of 2,2-bis(4-hydroxyphenyl)propane or of a novolac from phenol (which may be substituted in the ring by chlorine or a hydrocarbon alkyl group of from 1 to 4 carbon atoms) and formaldehyde, having an epoxide content of at least 1.0 epoxide equivalent per kilogram.

The curing agent may be an alkylenepolyamine containing at least two primary amino groups, such as diethylenetriamine, triethylenetetramine, and their 1,2-propylene homologues, and haxamethylenediamine and its 2,2,4-and 2,4,4-trimethyl analogues and cycloaliphatic amines such as 3-aminomethyl-3,5,5-trimethylcyclohexylamine (isophoronediamine). Particularly suitable are poly(aminoamides) obtainable in a known manner by the reaction of a polyalkylenepolyamine having at least four amino-hydrogen atoms per molecule with an at least dicarboxylic acid or an amide-forming derivative thereof (i.e., a derivative in which carboxyl groups are replaced by groups, such as carbalkoxy groups each of two to six carbon atoms, which react with a primary or secondary amine to produce amide groups) in such a manner that the product contains, as already indicated, at least three amino-hydrogen atoms per molecule. The carboxylic acid is preferably a dimerised or trimerised ethylenically-unsaturated aliphatic monocarboxylic acid such as linoleic acid; it may be modified by incorporation of styrene or other aromatic vinyl compound during oligomerisation, so forming an araliphatic acid.

Also suitable are adducts of such alkylenepolyamines and poly(aminoamides) with mono- or di-1,2-epoxides (for example, ethylene oxide, propylene oxide, and diglycidyl ethers of alcohols and phenols), it being understood that the adduct itself contains at least three hydrogen atoms directly attached to aliphatic or cycloaliphatic amino nitrogen atoms.

Suitable tertiary amines includes N-benzyldimethylamine, pentakis(N-methyl)diethylenetriamine, tri-n-amylamine, triethylamine, triethanolamine, Mannich bases of the formula XIX set out hereinafter, especially tris(dialkylaminoalkyl)phenols such as 2,4,6-tris(dimethylaminomethyl)phenol, and primary-tertiary amines, for example N,N-dialkylalkylenediamines such as N,N-diethylethane-1,2-diamine, N,N-dimethylpropane-1,3-diamine, and N-(2-aminoethyl)piperazine.

An effective amount of the curing agent (d) is employed. The proportion will depend upon its chemical structure and the properties sought in the curable composition and in its cured product. The optimum proportion can readily be determined by methods familiar to those skilled in the art. When the curing agent is one having at least three hydrogen atoms directly attached to aliphatic or cycloaliphatic amino-nitrogen atoms there will normally be used from about 0.8 to 1.2 amino-hydrogen equivalents of the amine per 1,2-epoxide equivalent of the epoxide resin. When the curing agent is a tertiary amine having at least one nitrogen atom attached directly to aliphatic or cycloaliphatic groups exclusively, and has at most two hydrogen atoms attached to amino nitrogen atoms there is generally used from 1 to 40 parts by weight per 100 parts by weight of the epoxide resin.

A wide range of polymercaptans is suitable for use as component (c) in the composition of this invention. Preferably there are used polymercaptans containing up to 6 mercaptan groups per molecule.

One class comprises esters of monomercaptancarboxylic acids with polyhydric alcohols and of monomercaptanmonohydric alcohols with polycarboxylic acids.

Further preferred such esters are of the formula

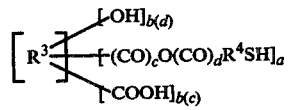

II where $R^3$ represents an aliphatic or araliphatic hydrocarbon radical of at least 2, and preferably at most 60, carbon atoms, which may contain not more than one ether oxygen atom, $R^4$ represents a hydrocarbon radical, which may contain not more than one carbonyloxy group, and is preferably of from 1 to 4 carbon atoms, $a$ is an integer of from 2 to 6, $b$ is zero or a positive integer of at most 3, such that $(a + b)$ is at most 6, and $c$ and $d$ each represent zero or 1, but are not the same.

Yet further preferred esters are polymercaptans of formula II which are also of the formula

III where $a$ has the meaning previously assigned.

$R^5$ is an aliphatic hydrocarbon radical of from 2 to 10 carbon atoms, and

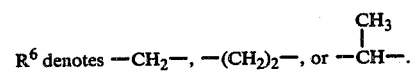

Also preferred are mercaptan-containing polyesters, including esters of monomercaptandicarboxylic acids, of formula $$R^9 + (O)_c - CO(O)_d - R^7(O)_d - CO(O)_c - R^8SH)_e \quad \text{IV}$$

where
$c$ and $d$ have the meaning previously assigned,
$e$ is an integer of from 1 to 6,
$R^7$ represents a divalent organic radical, linked through a carbon atom or carbon atoms thereof to the indicated —O— or —CO— units,
$R^8$ represents a divalent organic radical, linked through a carbon atom or carbon atoms thereof to the indicated —SH group and —O— or —CO— unit, and
$R^9$ represents an organic radical, which must contain at least one —SH group when $e$ is 1, linked through a carbon atom or carbon atoms thereof to the indicated —O— or —CO— unit.

Preferably, $R^7$ denotes, when $c$ is zero, a saturated aliphatic hydrocarbon chain of 2 to 250 carbon atoms, which may be substituted by methyl groups and by -SH groups and which may be interrupted by ether oxygen atoms and by carbonyloxy group; while, when $c$ is 1, $R^7$ preferably denotes
(a) a saturated aliphatic hydrocarbon group of 2 to 10 carbon atoms, which may bear m —SH group,
(b) a cycloaliphatic-aliphatic hydrocarbon group of 5 to 34 carbon atoms, which may contain ethylenic unsaturation, or
(c) a mononuclear arylene hydrocarbon group of 6 to 12 carbon atoms.

$R^8$ preferably denotes, when $c$ is zero, a saturated aliphatic hydrocarbon group of 1 to 3 carbon atoms, which may bear a carboxyl group, and, when $c$ is 1, $R^6$ preferably denotes a saturated aliphatic hydrocarbon group of 2 to 4 carbon atoms which may be substituted by a hydroxyl group or by a chlorine atom.

$R^9$ preferably denotes
(a) an aliphatic or cycloaliphatic-aliphatic hydrocarbon group of 2 to 51 carbon atoms, which may bear at least one -SH group,
(b) a mononuclear or dinuclear arylene hydrocarbon group of 6 to 15 carbon atoms,
(c) a chain of 4 to 250 carbon atoms, interrupted by at least one ether oxygen atom and optionally substituted by at least one —SH group, or
(d) a chain of 6 to 750 carbon atoms, interrupted by at least one carbonyloxy group, optionally interrupted by at least one ether oxygen atom and optionally substituted by at least one —SH group.

Also suitable are esters and ethers which are of the general formula

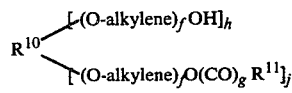

where
each "alkylene" group contains a chain of at least 2 and at most 6 carbon atoms between consecutive oxygen atoms,
$f$ is a positive integer, preferably such that the average molecular weight of the polymercaptan is not more than 1000,
$g$ is zero or 1, $h$ is zero or a positive integer such that $(h + j)$ is at most 6,
$j$ is an integer of from 2 to 6,
$R^{10}$ represents the radical of a polyhydric alcohol after removal of $(h + j)$ alcoholic hydroxyl groups, especially an aliphatic hydrocarbon radical of from 2 to 10 carbon atoms, and
$R^{11}$ represents an aliphatic radical containing at least one mercaptan group.

"Alkylene" units in individual poly(oxyalkylene) chains may be the same or different and they may be substituted by, e.g., phenyl or chloromethyl groups. Preferably they are —$C_2H_4$— or —$C_3H_6$— groups.

Preferred amongst the compounds of formula V are the esters of formula

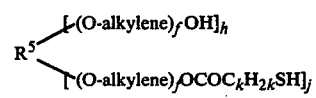

and ethers of formula

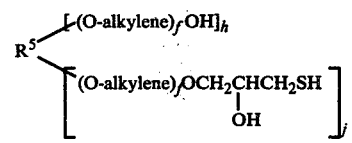

where
"alkylene", $R^5$, $f$, $h$, and $j$ have the meanings previously assigned, and
$k$ is 1 or 2.

Yet other suitable polymercaptans are mercaptan-terminated sulphides of the general formula

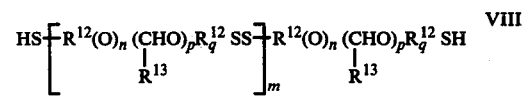

where
each $R^{12}$ denotes an alkylene hydrocarbon group containing from 2 to 4 carbon atoms,
$R^{13}$ denotes —H, —$CH_3$, or —$C_2H_5$,
$m$ is an integer which has an average value of at least 1, and is preferably such that the average molecular weight of the sulphide is at most 1000, and
either $n$ is zero, in which case $p$ and $q$ are each also zero, or $n$ is 1, in which case $p$ is zero or 1 and $q$ is 1.

The preferred sulphides are those of formula VIII where $R^{13}$ denotes hydrogen and $n$ and $p$ are each 1, $m$ being such that the molecular weight of the sulphide is from 500 to 8000.

Another class of polymercaptans comprises mercaptan-terminated poly(butadienes) of the formula

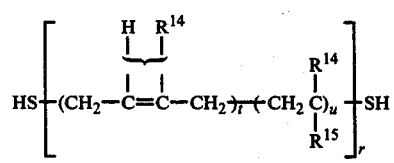

or

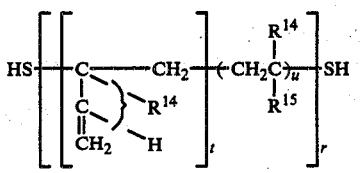
X where
each $R^{14}$ represents —H or —$CH_3$,
$R^{15}$ represents —CN, —COOH, —$CONH_2$, —$COOR^{16}$, —$C_6H_5$, or —$OCOR^{16}$, where $R^{16}$ is an alkyl group of one to eight carbon atoms,
$t$ is an integer of at least one,
$u$ is zero or a positive integer, and
$r$ is an integer of more than one, preferably such that the average number molecular weight of the polymercaptan is not more than 1000.

Preferably the polymercaptans of formula IX are also of the formula

XI and those of formula X are correspondingly of the formula

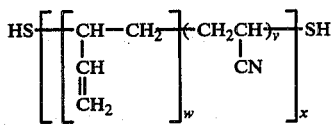
XII where
$v$ is either zero, in which case $w$ is 1, or it is 1, in which case $w$ is an integer of from 2 to 5, and
$x$ is an integer such that the average molecular weight of the polymercaptan is at least 1250 and at most 5000.

Yet another suitable class of polymercaptans comprises the mercaptan-terminated oxyalkylene compounds of the general formula

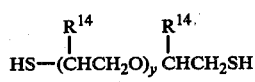
XIII where each $R^{14}$ has the meaning previously assigned and $y$ is an integer of from 1 to 4.

A still further class comprises poly(monomercaptancarboxylates), especially the thioglycollates and mercaptopropionates, of tris(2-hydroxyethyl) isocyanurate or of tris(2-hydroxypropyl) isocyanurate, i.e., the compounds of formula

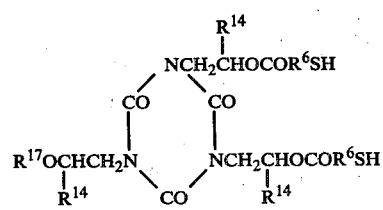
XIV where $R^{17}$ denotes —H or a group —$COR^6SH$, and each $R^6$ and $R^{14}$ have the meanings previously assigned.

Polyenes preferred for the purposes of this invention have an average molecular weight of not more than 2000 and they contain at least two ethylenic double bonds each α to a carbonyloxy group, especially in the form of maleic acid residues of formula

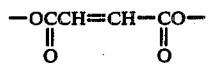
XV directly attached at each end to carbon atoms, or in the form of itaconic acid residues of formula

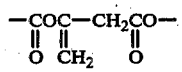
XVI directly attached at each end to carbon atoms, or in the form of acrylic residues of formula

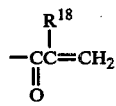
XVII directly attached to carbon atoms, where $R^{18}$ denotes —H, —Cl, —Br, or an alkyl group of 1 to 4 carbon atoms.

Preferably the polyenes contain, per molecule, up to six ethylenically-unsaturated units of formula XV, XVI, or XVII.

Particularly preferred polyenes are maleic esters of poly(oxyalkylene) polyols and contain the repeating unit

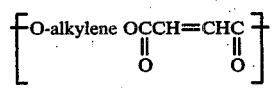
XVIII where "alkylene" has the meaning assigned above.

preferably the polymercaptan is employed in a quantity sufficient to supply from 0.8 to 1.1 mercaptan groups per said ethylenic double bond of the polyene, and the compositions contain from 10 to 150, and especially up to 75, parts by weight of the polymercaptan plus polyene per 100 parts by weight of the epoxide resin. The optimum amounts for a particular composition may readily be ascertained by simple experiment.

Desirably, at least one of the polyene and the polymercaptan has an average molecular weight of not more than 1000.

The compositions may be heated, e.g., at temperatures of from 35° C to 150° C, to increase the rate of curing, but often they will cure sufficientaly rapidly at room temperature for most purposes. Conventional accelerators for promoting the curing of the epoxide resin (a) by its curing agent (d) may also be included, particularly when that agent is a poly(aminoamide). Such accelerators include aliphatic amines containing at least one tertiary amino group and at most one primary amino group, such as N,N-dialkylethane-1,2-diamines and N,N-dialkylpropane-1,3-diamines, especially the N,N-dimethyl and N,N-diethyl derivatives, and also Mannich bases of the formula $$R^{19}(CH_2NR^{20}R^{20})_{a_1} \quad \text{XIX}$$

where $a_1$ is an integer of at least 1 and is preferably 3 or 4, $R^{19}$ represents the radical of a mononuclear or polynuclear phenol, which may be monohydric or polyhydric, the said radical having $a_1$ free valencies, and each $R^{20}$ represents an alkyl or hydroxyalkyl group of up to four carbon atoms.

A preferred Mannich base is 2,4,6-tris(dimethylaminomethyl)phenol.

The compositions may also contain an accelerator for the reaction between the polyene and the polymercaptan, this accelerator usually being an organic or inorganic Bronsted base or a free-radical catalyst. The latter are of general applicability and include organic or inorganic peroxides and persalts such as benzoyl peroxide, hydrogen peroxide, tert.butyl hydroperoxide, di-isopropyl peroxydicarbonate, and ammonium persulphate. For the preferred polyenes, i.e., those having ethylenic double bonds α to carbonyloxy groups, Bronsted bases may be used instead. Examples of suitable Bronsted bases are primary, secondary, and tertiary amines, such as triethylamine, N,N-dimethylaniline, and N-benzyldimethylamine, lower alkanolamines (e.g., mono-, di-, and tri-ethanolamine), lower alkylenepolyamines (e.g., ethylenediamine, diethylenetriamine, triethylenetetramine, tetraethylenepentamine, propane-1,2-diamine, propane-1,3-diamine, and hexamethylenediamine), also quaternary ammonium bases such as tetramethylammonium hydroxide, and water-soluble inorganic hydroxides (especially sodium hydroxide) and inorganic salts such as trisodium phosphate, sodium carbonate, sodium bicarbonate, sodium pyrophosphate, and sodium acetate.

Of course, some curing agents for epoxide resins are also Bronsted bases, as are some accelerators for the curing of epoxide resins, and when such a curing agent or accelerator is used there is normally no advantage in employing another such base to promote the reaction between the polymercaptan and the polyenes.

Optionally, plasticisers may be incorporated and these include dibutyl phthalate, dioctyl phthalate, and tricresyl phosphate. There may also be present so-called reactive diluents, especially monoepoxides such as n-butyl glycidyl ether, iso-octyl glycidyl ether, phenyl glycidyl ether, cresyl glycidyl ethers, glycidyl acrylate, glycidyl methacrylate, and glycidyl esters of branched tertiary, aliphatic monocarboxylic acids. The compositions may also contain fillers, colouring matter, flow-control agents, and flame inhibitors. Suitable extenders and fillers are asphalt, bitumen, glass fibres, ballotini, mica, quartz flour, calcium carbonate, talc, cellulose, kaolin, vollastonite, and colloidal silica having a large specific surface area.

The compositions of the present invention may be supplied as a two-part pack; preferably, one part contains the epoxide resin (a) and the polyene (c) and the other the curing agent (d) and the polymercaptan (b), because, otherwise, the epoxide resin may be cured prematurely on storage by means of the polymercaptan, and further, the curing agent (d), unless it is exclusively a tertiary amine, may react at the ethylenic double bonds of the polyene (c). Because, too, polymercaptan-carboxylates react on prolonged contact with aliphatic amines, it is preferred, where the composition is to be packaged in parts, to use as component (b) a polymercaptan which contains no carboxylic ester groups.

A particularly preferred combination of curing agent and polymercaptan for prolonged storage is a poly(aminoamide) and a polymercaptan of the general formula VII or VIII.

The compositions may, of course, also be supplied as a three-part pack, the epoxide resin being mixed with the polyene (c).

The following Examples illustrate the invention. Unless otherwise indicated, parts are by weight. Temperatures are in degrees Celsius.

Polymercaptan A is substantially of the average formula

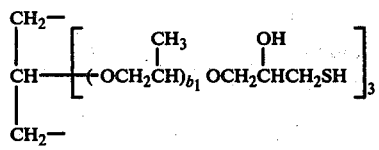
XX where $b_1$ is an integer of average value 2.5 and was prepared as described in U.S. Pat. No. 3,258,495.

Polymercaptan B is the commercially-available polysulphide substantially of the average formula

XXI

Polymercaptan C is of the formula

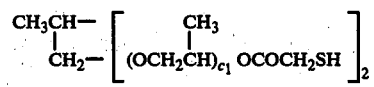
XXII wherein $c_1$ is an integer of average value 3.16. The preparation of mercaptancarboxylates of polyoxyalkylene polyols such as Polymercaptans C to F and H is described in British patent Specification No. 1278934.

Polymercaptan D is of the formula

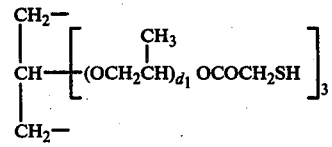
XXIII where $d_1$ is an integer of average value 3.69.

Polymercaptans E and F are of formula XXIII, where $d_1$ is an integer of average value 5.41 and 7.14, respectively.

Polymercaptan G is the tetrakis(3-mercaptopropionate) of pentaerythritol.

Polymercaptan H is of the formula

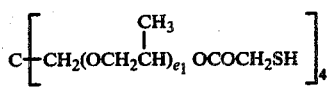

where $e_1$ is an integer of average value 2.55.

Polymercaptan J is a hydroxyl-terminated polyester from 1,1,1-trimethylolpropane (1 mol.), adipic acid (3 mol.,), and butane-1,4-diol (3 mol.), esterified with 3 mol. of 3-mercaptopropionic acid, prepared by the procedure described in British patent specification No. 1,311,090.

Polymercaptan K is a mercaptan-terminated butadiene-acrylonitrile copolymer and has the general formula

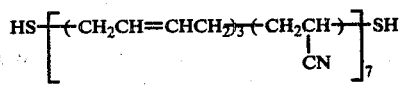

and/or

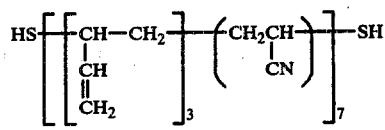

Polyene I

This polyester is made in a conventional manner by the reaction of maleic anhydride (3.06 mol.) with dipropylene glycol (3.21 mol).

Polyene II

This polyester is prepared similarly from dipropylene glycol (2.1 mol.), maleic anhydride (1 mol.), and adipic acid (1 mol.).

Polyene III

Butane-1,4-diol diglycidyl ether of epoxide content 7.4 equiv./kg (108 g), itaconic acid (65 g), n-butyl glycidyl ether (28.1 g), N-benzyldimethylamine (2 g), and hydroquinone (0.2 g) are mixed and heated to 120°, when an exothermic reaction sets in, the temperature of the mixture rising to 250°. The product is rapidly cooled to 120°, and heated at that temperature for 1 hour. Polyene III is substantially of the formula

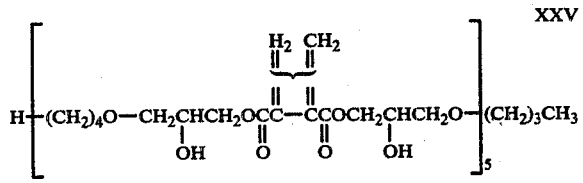

Polyene IV 2,2-bis(4-Hydroxyphenyl)propane (114 g), n-butyl glycidyl ether (130 g), and N-benzyldimethylamine (2 g) are heated at 120° for 1 hour, then cooled to 70°. Maleic anhydride (98 g) is added and heating is continued at 120° for 100 minutes. The product, Polyolefin IV, is substantially of the formula

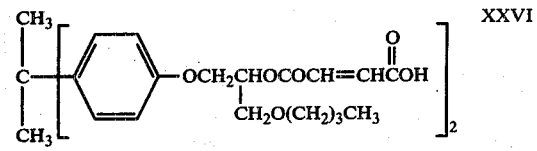

Polyene V

A glycerol-propylene oxide adduct of average molecular weight 1000 (200 g) is heated for 2 hours at 120° with 58.8 g of maleic anhydride in the presence of 2.6 g of N-benzyldimethylamine.

Polyene V is substantially of the formula

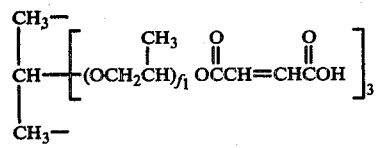

where $f_1$ is an integer of average value 15.65.

Polyene VI

This is made similarly from 100 g of a glycerol-propylene oxide adduct of average molecular weight 300 and maleic anhydride (98 g) with 3 g of triethylamine as catalyst. Polyene VI is substantially of formula XXVII, where $f_1$ is an integer of average value 3.59.

Polyene VII

Butane-1,4-diol (108 g), maleic anhydride (98 g), and xylene (135 g) are heated together with stirring water reflux for 2 hours. Water formed during the reaction is removed by azeotropic distillation using a Dean and Stark trap. Toluene-p-sulphonic acid (2 g) is added and heating at reflux is continued for a further 2 hours. The mixture is cooled to 50°, neutralised with aqueous potassium bicarbonate solution, the water and xylene are distilled off, and the residue is filtered.

Polyene VII is substantially of the formula

Polyene VIII

A glycerol-propylene oxide adduct of average molecular weight 600 (600 g,) is heated with 294 g of maleic anhydride in the presence of 9 g of triethylamine for 2 hours at 120°. Then n-butyl glycidyl ether of epoxide content 7.7 equiv./kg. (331 g) is added dropwise in an atmosphere of nitrogen and the mixture is heated for 1 3/4 hours at 120°.

Polyene VII is substantially of the formula

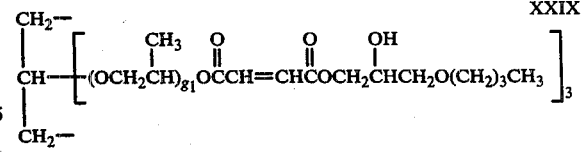

where $g_1$ is an integer of average value 8.76.

Polyene IX

Glycerol (92 g,) and maleic anhydride (294 g) are heated for 2 hours at 120° in the presence of 3.8 g of N-benzyldimethylamine. Then 343 g of n-butyl glycidyl ether (epoxide content 7.0 equiv./kg) is added dropwise, an exothermic reaction taking place, and the mixture is heated for 2 hours at 120° in an atmosphere of nitrogen.

Polyene IX is of formula XXIX, where $g_1$ is zero.

Polyene X 2,2-bis-(p-Glycidyloxyphenyl)propane, of epoxide content 5.2 equiv./kg (384 g), is heated for 2 hours at 120° with 144 g of acrylic acid in the presence of 5.3 g of N-benzyldimethylamine as catalyst and 0.53 g of p-methoxyphenol as polymerisation inhibitor.

Polyene X is of the formula

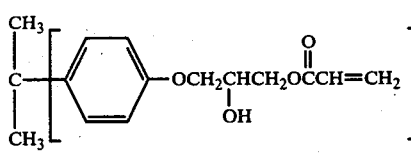

XXX

Polyene XI is the tetrakis(methacrylate) of the adduct of pentaerythritol and ethylene oxide, i.e., is of the formula

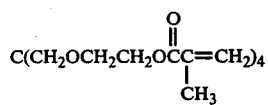

XXXI

Epoxide resin I denotes a polyglycidyl ether of 2,2-bis(4-hydroxyphenyl)propane having a viscosity at 21° in the range 200 to 400 poises: its epoxide content is 5.1–5.4 equiv./kg.

Epoxide resin II denotes a polyglycidyl ether of a phenol-formaldehyde novolak of average molecular weight 420. It has an epoxide content of 5.5–5.7 equiv./kg.

Epoxide resin III denotes bis(4-(diglycidylamino)phenyl)methane having an epoxide content of 7.5–8.5 equiv./kg.

Epoxide resin IV denotes a polyglycidyl ether of bis(4-hydroxyphenyl)methane having an epoxide content of 5.8 equiv./kg.

Epoxide resin V denotes diglycidyl hexahydrophthalate having an epoxide content of 6.2–6.8 equiv./kg.

Epoxide resin VI denotes 1-glycidyloxymethyl-3-glycidyl-5,5-dimethylhydantoin having an epoxide content of 7.0–7.4 equiv./kg.

Epoxide resin VII denotes 4-(diglycidylamino)phenyl glycidyl ether having an epoxide content of 9.4–10.5 equiv./kg.

Hardener I denotes a poly(aminoamide) obtained by reaction of diethylenetriamine with a mixture of dimerised and trimerised linoleic acid: its amine value is 210–220 mg KOH/g

Hardeners II and III denote poly(aminoamide)s prepared in a similar manner to Hardener I but having an amine value of 350–400 mg KOH/g and 290–320 mg KOH/g respectively.

Hardener IV denotes a poly(aminoamide) prepared from a monomeric fatty acid and an aliphatic polyamide and having an amine value of 580–620 mg KOH/g

Hardener V denotes a similar poly(aminoamide) having an amine value of 350–380 mg KOH/g

Hardener VI denotes N-(2-aminoethyl)piperazine

Hardener VII denotes isophoronediamine

Hardener VIII denotes a commercial mixture of 2,2,4- and 2,4,4-trimethyl-hexamethylenediamine

Hardener IX denotes triethylenetetramine

Hardener X denotes N,N-diethylpropane-1,3-diamine

Hardener XI denotes 2,4,6-tris(dimethylaminomethyl)phenol

Hardener XII denotes 3,3-dimethyl-4,4-diaminodicyclohexylmethane

Hardener XII denotes a poly(oxypropylene) triprimary amine (i.e., a trihydric aliphatic alcohol having three oxypropylene chains attached to the hydroxyl groups, each terminated by a primary amino group) of average molecular weight 400.

Accelerator I is 2,4,6-tris(dimethylaminomethyl)phenol. Shear strengths of joints were determined using aluminum alloy strips 1.63 mm thick obtained under the designation "2L 73 Alclad" which had been degreased, pickled by the process prescribed in the British Ministry of Technology Aircraft Process Specification DTD-915B, washed in running water, and dried at room temperature ("Alclad" is a registered Trade Mark). Single lap joints 12 mm × 25 mm were prepared. T-peel strengths were determined by the procedure described in United States Military Specification MMM-A-132. Sheets of "2L 61 Alclad", 0.056 mm thick and 24 mm wide were used. Gelation times were determined by ascertaining when the mixture, stirred with a small wooden spatula, became a rubbery solid and/or formed "strings" when pulled.

EXAMPLE 1

The mixtures shown in Table I were prepared and their gelation times at room temperature, on 10 g samples, were measured.

TABLE I

| Epoxide resin I | Hardener I | Accelerator I | Polymercaptan A | Polymercaptan B | Polyene I | Polyene II | Gel time (mins.) |
|---|---|---|---|---|---|---|---|
| 100 | 40 | 2 | — | — | — | — | >60 |
| 100 | 40 | 2 | — | — | 10 | — | >60 |
| 100 | 40 | 2 | — | — | 40 | — | >60 |
| 100 | 40 | 2 | 10 | — | 10 | — | 0.5 |
| 100 | 40 | 2 | 50 | — | 10 | — | 0.25 |
| 100 | 40 | 2 | 10 | — | 40 | — | 0.5 |
| 100 | 40 | 2 | — | 10 | 10 | — | 1 |
| 100 | 55 | 5 | 10 | — | 5 | — | 1 |
| 100 | 55 | 5 | 15 | — | 5 | — | 2.5 |
| 100 | 55 | 5 | 10 | — | — | 10 | 3 |
| 100 | 55 | 5 | 10 | — | — | 15 | 1.5 |
| 100 | 55 | 5 | 15 | — | — | 15 | 1 |
| 100 | 55 | 5 | 20 | — | — | 15 | 1 |
| 100 | 55 | 5 | — | 15 | — | 15 | 1 |
| 100 | 55 | 5 | — | 20 | — | 15 | 1 |

In each experiment, except the first three, the gelling mixtures became tacky.

EXAMPLE 2

To mixtures at room temperature comprising 100 parts of Epoxide resin I and 23 or 7.5 parts, respectively, of N-(2-hydroxypropyl)triethylenetetramine or N,N-dimethylpropane-1, 3-diamine were added 15 parts of Polyene II and 15 parts of Polymercaptan A. The mixtures (10 g-portions) gelled in half a minute and one minute, respectively, and became tacky.

EXAMPLE 3

Mixtures were prepared, each containing 55 parts of Hardener I, 5 parts of Accelerator I, and 15 parts of Polymercaptan A. To a 5 g portion of each mixture was added with stirring 5 g portions of mixtures each comprising 100 parts of Epoxide resin I and 15 parts of a polyene (Polyenes I to XI). In every case the admixtures gelled within 10 minutes at room temperature, and became tacky. If, however, either Polymercaptan A or the polyene were omitted, gelling did not take place within 30 minutes.

EXAMPLE 4

Mixtures were prepared, each containing 15 parts of Polyene II and 100 parts of Epoxide resin I. Separately, mixtures, each containing 55 parts of Hardener I, 5 parts of Accelerator I, and 15 parts of a Polymercaptan (Polymercaptans C to J inclusive), were made, and portions, each 5 g, of the epoxide resin mixture were mixed with 5 g portions of the polymercaptan-containing mixture. In every case the admixtures gelled within 10 minutes at room temperature, and developed tack.

EXAMPLE 5

Further compositions were prepared, each containing 100 parts of Epoxide resin I, 55 parts of Hardener I, 5 parts of Accelerator I, and certain Polymercaptans and Polyenes as indicated in Table II. The compositions were cured, either at room temperature for 24 hours or at 100° for 30 minutes, and the lap shear strengths and T-peel strengths of bonds formed with the compositions were measured.

TABLE II

| Polymercaptan | | Polyene | | Cured for 24 hours at 22° | Cured for 30 minutes at 100° | | |
|---|---|---|---|---|---|---|---|
| | | | | lap shear strength | lap shear strength | | T-peel strength |
| Designation | Parts | Designation | Parts | (MPa) measured at 22° | (MPa) measured at 22° | at 60° | (N/mm) measured at 22° |
| A | 10 | I | 15 | 22.2 | 29.1 | 24.5 | 1.3 |
| A | 15 | I | 15 | 24.6 | 32.3 | 21.4 | 1.4 |
| A | 20 | I | 15 | 21.3 | 34.3 | 21.8 | 1.6 |
| A | 15 | V | 15 | — | 22.8 | 30.4 | 1.6 |
| A | 15 | VI | 15 | — | 22.8 | 21.7 | 0.9 |
| A | 15 | VIII | 15 | — | 22.1 | 20.0 | 1.3 |
| A | 15 | IX | 15 | — | 22.1 | 20.6 | 1.2 |
| B | 10 | I | 15 | 18.5 | 30.7 | 26.8 | 2.4 |
| B | 15 | I | 15 | 19.5 | 15.9 | 13.3 | 1.5 |
| B | 20 | I | 15 | 20.3 | 10.3 | 9.8 | 1.2 |
| F | 15 | II | 15 | — | 31.2 | 21.7 | 2.8 |
| G | 15 | II | 15 | — | 26.7 | 22.9 | 1.6 |
| J | 15 | II | 15 | — | 28.3 | 24.8 | 1.4 |

— denotes not determined

In each case the compositions became tacky.

EXAMPLE 6

Further compositions were prepared, each containing 100 parts of an epoxide resin, a stoichiometric amount of Hardener II, 15 parts of Polyene II, 5 parts of Accelerator I, and 15 parts of Polymercaptan A. The compositions were cured for 30 minutes at 100° before determination of the lap shear and T-peel strengths. In all cases the compositions became tacky before curing. The results are given in Table III.

TABLE III

| Epoxide resin | Hardener II parts | Gel time (mins) | Lap shear strength (MPa) measured | | T-peel strength (N/mm) measured at 22° |
|---|---|---|---|---|---|
| | | | at 22° | at 60° | |
| I | 55 | 1¾ | 34 | 29 | 1.2 |
| II | 60 | 3½ | 18 | 13 | 1.8 |
| III | 55 | 3½ | 15 | 14 | 1.1 |
| IV | 60 | 2 | 24 | 18 | 1.8 |
| V | 70 | ¾ | 31 | 10 | 3.4 |
| VI | 75 | 2 | 27 | 15 | 1.8 |
| VII | 115 | 1¼ | 24 | 22 | 1.5 |

When, for comparative purposes, Hardener II and Accelerator I were replaced by a conventional mixed aromatic amine curing agent (m-phenylenediamine and bis(p-aminophenyl)methane), by a conventional anhydride curing agent (maleic anhydride or methyl tetrahydrophthalic anhydride), or by a conventional latent curing agent (dicyandiamide or boron trichloride-n-octyldimethylamine complex), the mixtures did not gel within 30 minutes of mixing at room temperature. These compositions were therefore not suitable as tacky adhesives.

EXAMPLE 7

Example 6 was repeated, using 100 parts of Epoxide resin I and various curing agents, the other components remaining the same as in Example 6. The results are given in Table IV.

TABLE IV

| Hardener Type | parts | Gel time (mins) | Lap shear strength (MPa) measured at 22° | at 60° | T-peel strength (N/mm) measured at 22° |
|---|---|---|---|---|---|
| I | 100 | 4½ | 29 | 11 | 2.6 |
| III | 85 | 1 | 25 | 13 | 3.0 |
| IV | 40 | ¾ | * | * | * |
| V | 60 | ¾ | * | * | * |

*these tests could not be carried out as the composition gelled before the specimens could be prepared.

EXAMPLE 8

Example 6 was repeated, using 100 parts of Epoxide resin I, 55 parts of Hardener II, 15 parts of Polymercaptan B or K, with the other components the same as in Example 6. The results are given in Table V.

TABLE V

| Polymer-captan | Gel time (mins) | Lap shear strenght (MPa) measured at 22° | at 60° | T-peel strength (N/mm) measured at 22° |
|---|---|---|---|---|
| B | 1¼ | 17 | 23 | 1.2 |
| K | ¾ | 30 | 23 | 2.7 |

EXAMPLE 9

Example 6 was repeated, using 100 parts of Epoxide resin I, 15 parts of Polymercaptan A, 15 parts of Polyene II, and various curing agents. The results are given in Table VI.

TABLE VI

| Hardener Type | Parts | Gel time | Lap shear strength (MPa) measured at 23° | at 60° | T-peel strength (N/mm) measured at 23° |
|---|---|---|---|---|---|
| VI | 13 | 25 sec. | * | * | * |
| VII | 22.5 | 20 sec. | * | * | * |
| VIII | 21 | 20 sec. | * | * | * |
| IX | 12 | 15 sec. | * | * | * |
| X | 10 | 13 sec. | * | * | * |
| XI | 11 | 3¾ min. | 20.7 | 25.2 | 1.6 |
| XII | 32 | 1¼ min. | 7.6 | 5.3 | — |
| XIII | 38 | 1½ min. | 16.0 | 2.2 | 3.5 |

*these tests could not be performed as the composition gelled before the specimens could be prepared
— denotes that this test was not carried out.

We claim:

1. A composition which rapidly develops tack after mixing consisting essentially of (a) an epoxide resin having, per epoxide molecule, more than one 1,2-epoxide group of formula

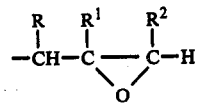

directly attached to oxygen, sulfur, or nitrogen, where either R and $R^2$ independently of one another represent hydrogen, in which case $R^1$ denotes hydrogen or methyl, or R and $R^2$ conjointly represent —$CH_2 CH_2$—, in which case $R^1$ denotes hydrogen, (b) a polymercaptan having at least two mercaptan groups per average molecule, (c) a polyene having an average molecular weight of not more than 2,000, per average molecule, at least two ethylenic double bonds, each β to an atom of oxygen, sulfur, or nitrogen, the sum of such ethylenic double bonds in (c) and of mercaptan groups in (b) being at least 5, and (d) a curing agent for the epoxide resin, which is either a compound having at least three hydrogen atoms directly attached to aliphatic or cycloaliphatic amino nitrogen atoms present in an amount of from about 0.8 to 1.2 amino-hydrogen equivalents of the amine per 1,2-epoxide equivalent of the epoxide resin, or a tertiary amine having at least one nitrogen atom directly attached to carbon atoms of aliphatic or cycloaliphatic groups exclusively and at most two hydrogen atoms attached to amino nitrogen atoms present in an amount of from 1 to 40 parts by weight per 100 parts by weight of the epoxide resin, and wherein the polymercaptan is employed in a quantity sufficient to supply from 0.8 to 1.1 mercaptan groups per ethylenic double bond of the polyene and the polymercaptan plus polyene are present in amount of from 10 to 150 parts by weight per 100 parts by weight of the epoxide resin.

2. A composition according to claim 1, wherein the epoxide resin is a polyglycidyl ester, a poly(β-methylglycidyl) ester, a polyglycidyl ether, a poly(β-methylglycidyl) ether, a poly(N-glycidyl) compound or a poly(N-β-methylglycidyl) compound.

3. A composition according to claim 1, wherein the polymercaptan contains up to 6 mercaptan groups per average molecule.

4. A composition according to claim 1, wherein the polymercaptan is an ester of a monomercaptancarboxylic acid with a polyhydric alcohol or of a monomercaptanmonohydric alcohol with a polycarboxylic acid.

5. A composition according to claim 4, wherein the polymercaptan is of the formula

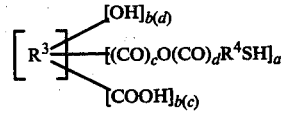

where
$R^3$ represents an aliphatic or araliphatic hydrocarbon radical of at least 2 and at most 60 carbon atoms, which may contain not more than one ether oxygen atom,
$R^4$ represents a hydrocarbon radical of 1 to 4 carbon atoms, which may contain not more than one carbonyloxy group, a is an integer of from 2 to 6, b is zero or a positive integer of at most 3, such that (a + b) is at most 6, and c and d each represent zero or 1, but are not the same.

6. A composition according to claim 5, in which the polymercaptan is of the formula $$R^5(OCOR^6SH)_a$$

where a is as defined in claim 5, $R^5$ is an aliphatic hydrocarbon radical of from 2 to 10 carbon atoms, and $R^6$ denotes —CH$_2$—, —(CH$_2$)$_2$—, or $$\begin{array}{c} CH_3 \\ | \\ -CH- \end{array}.$$

7. A composition according to claim 5, wherein the polymercaptan is of the formula $$R^9{}_+(O)_c{-}CO(O)_d{-} R^7(O)_d{-}CO(O)_c{-}R^8SH)_e$$

where c and d are as defined in claim 5, e is an integer of from 1 to 6, $R^7$ represents a divalent organic radical, linked through a carbon atom or carbon atoms thereof to the indicated —O— or —CO— units, $R^8$ represents a divalent organic radical, linked through a carbon atom or carbon atoms thereof to the indicated -SH group and -O- or —CO— unit, and $R^9$ represents an organic radical, which must contain at least one —SH group when e is 1, linked through a carbon atom or carbon atoms thereof to the indicated —O— or —CO— unit.

8. A composition according to claim 7, where either c is zero and $R^7$ represents a saturated aliphatic hydrocarbon chain of 2 to 250 carbon atoms, which may be substituted by methyl groups and by -SH groups and which may be interrupted by ether oxygen atoms and by carbonyloxy groups, or c is 1 and $R^7$ represents (a) a saturated aliphatic hydrocarbon group of 2 to 10 carbon atoms, which may bear an —SH group, (b) a cycloaliphatic-aliphatic hydrocarbon group of 5 to 34 carbon atoms, which may contain ethylenic unsaturation, or (c) a mononuclear arylene hydrocarbon group of 6 to 12 carbon atoms.

9. A composition according to claim 7, wherein, when c is zero, $R^8$ represents a saturated aliphatic hydrocarbon group of 1 to 3 carbon atoms, which may bear a carboxyl group, and, when c is 1, $R^8$ denotes a saturated aliphatic hydrocarbon group of 2 to 4 carbon atoms which may be substituted by a hydroxyl group or by a chlorine atom.

10. A composition according to claim 7, wherein $R^9$ denotes (a) an aliphatic or cycloaliphatic-aliphatic hydrocarbon group of 2 to 51 carbon atoms, which may bear at least one -SH group (b) a mononuclear or dinuclear arylene hydrocarbon group of 6 to 15 carbon atoms, (c) a chain of 4 to 250 carbon atoms, interrupted by at least one ether oxygen atom and optionally substituted by at least one —SH group, or (d) a chain of 6 to 750 carbon atoms, interrupted by at least one carbonyloxy group, optionally interrupted by at least one ether oxygen atom and optionally substituted by at least one —SH group.

11. A composition according to claim 3, wherein the polymercaptan is of the formula

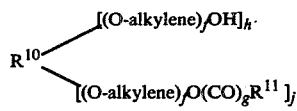

where each "alkylene" group contains a chain of at least 2 and at most 6 carbon atoms between consecutive oxygen atoms, f is a positive integer, such that the average molecular weight of the polymercaptan is more than 10,000, g is zero or 1, h is zero or a positive integer such that (h + j) is at most 6, j is an integer of from 2 to 6, $R^{10}$ represents the aliphatic hydrocarbon radical, containing from 2 to 10 carbon atoms, of a polyhydric alcohol after removal of (h + j) alcoholic hydroxyl groups, and $R^{11}$ represents an aliphatic radical containing at least one mercaptan group.

12. A composition according to claim 11, wherein the polymercaptan is an ester of the formula

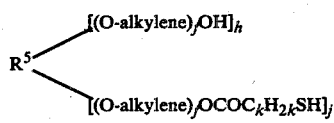

or an ether of the formula

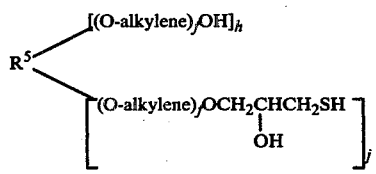

where $R^5$ is as defined in claim 6, "alkylene", f, h, and j, are as defined in claim 11, and k is 1 or 2.

13. A composition according to claim 3, wherein the polymercaptan is a mercaptan-terminated sulfide of the general formula

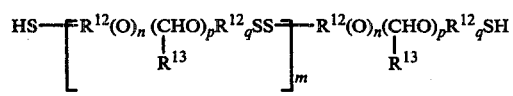

where each $R^{12}$ denotes an alkylene hydrocarbon group containing from 2 to 4 carbon atoms, $R^{13}$ denotes —H, —CH$_3$, or —C$_2$H$_5$, m is an integer which has an average value of at least 1, such that the average molecular weight of the sulfide is at most 10,000, and either n is zero, in which case p and q are each also zero, or n is 1, in which case p is zero or 1 and q is 1.

14. A composition according to claim 13, where $R^{13}$ denotes hydrogen and n and p are each 1.

15. A composition according to claim 3, wherein the polymercaptan is a mercaptan-terminated poly(butadiene) of the formula

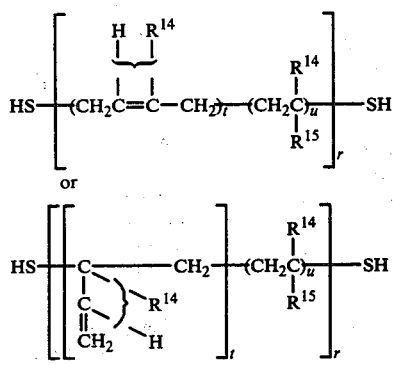

each $R^{14}$ represents —H or —CH$_3$, $R^{15}$ represents —CN, —COOH, —CONH$_2$, —COOR$^{16}$, —C$_6$H$_5$, or —OCOR$^{16}$, where $R^{16}$ is an alkyl group of one to eight carbon atoms, t is an integer of at least one, u is zero or a positive integer, and r is an integer of more than one, such that the average molecular weight of the polymercaptan is not more than 10,000.

16. A composition according to claim 15, wherein the polymercaptan is of the formula

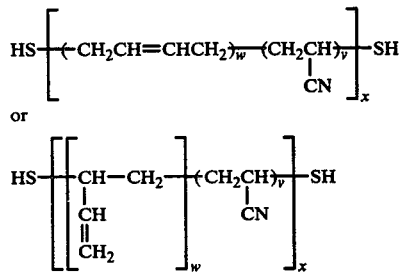

where v is either zero, in which case w is 1, or it is 1, in which case w is an integer of from 2 to 5, and x is an integer such that the average molecular weight of the polymercaptan is at least 1250 and at most 5000.

17. A composition according to claim 3, wherein the polymercaptan is a mercaptan-terminated oxyalkylene compound of the general formula

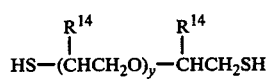

where each $R^{14}$ has the meaning assigned in claim 15, and y is an integer of from 1 to 4.

18. A composition according to claim 3, wherein the polymercaptan is of the formula

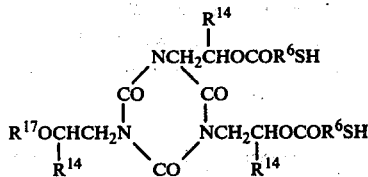

where each $R^6$ is as defined in claim 6, each $R^{14}$ is as defined in claim 15, and $R^{17}$ denotes —H or a group —COR$^6$SH.

19. A composition according to claim 1, wherein the polyene has an average molecular weight of not more than 2000 and contains at least two ethylenic double bonds, each α to a carbonyloxy group.

20. A composition according to claim 19, wherein the polyene contains at least two maleic acid residues of formula

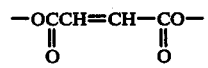

directly attached to each end to carbon atoms, or itaconic acid residues of formula

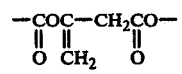

directly attached at each end to carbon atoms, or acrylic residues of formula

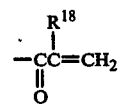

directly attached to carbon atoms, where $R^{18}$ denotes —H, —Cl, —Br or an alkyl group of 1 to 4 carbon atoms.

21. A composition according to claim 20, wherein the polyene contains at most six such ethylenically-unsaturated units.

22. A composition according to claim 20, wherein the polyene is a maleic ester of a poly(oxyalkylene) polyol and contains the repeating unit

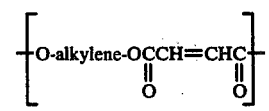

where "alkylene" is as defined in claim 11.

23. A composition according to claim 1, wherein at least one of the polyene and the polymercaptan has an average molecular weight of not more than 1000.

24. A composition according to claim 1, wherein the curing agent (d) is a compound having at least three hydrogen atoms directly attached to aliphatic or cycloaliphatic amino nitrogen atoms and provides from 0.8 to 1.2 aliphatic or cycloaliphatic amino nitrogen atoms per 1,2-epoxide group of the epoxide resin.

25. A composition according to claim 1, wherein the curing agent (d) is a tertiary amine having at least one nitrogen atom directly attached to carbon atoms of aliphatic or cycloaliphatic groups exclusively and at most two hydrogen atoms attached to amino nitrogen atoms and there is used from 1 to 40 parts by weight of such a curing agent per 100 parts by weight of the epoxide resin.

26. A composition according to claim 1, wherein the curing agent (d) is an alkylenepolyamine containing at least two primary amino groups, a poly(aminoamide) obtainable by reaction of such an alkylenepolyamine with an at least dicarboxylic acid or an amide-forming derivative thereof, or an adduct of such an alkylenepolyamine or of such a poly(aminoamide) with a mono- or di-1,2-epoxide.

27. A composition according to claim 1, wherein the curing agent (d) is a cycloaliphatic polyamine containing at least two primary amino groups, a poly(aminoamide) obtainable by reaction of such a cycloaliphatic polyamine with an at least dicarboxylic acid or an adduct of such a cycloaliphatic polyamine or of such a poly(aminoamide) with a mono- or di-1,2-epoxide.

28. A composition according to claim 1, which further contains an accelerator for the reaction between the polymercaptan (b) and the polyene (c).

29. A composition according to claim 20, wherein the accelerator is a Bronsted base or a free-radical catalyst.

30. A composition according to claim 1, in which the curing agent (d) is a poly(aminoamide) and the composition further contains an accelerator for the curing of the epoxide resin (a).

31. A composition according to claim 30, in which the accelerator is an aliphatic amine containing at least one tertiary amino group and at most one primary amino group or is a Mannich base.

32. A two-part pack, the contents of which, on mixing, provide a composition as claimed in claim 1, one part containing an epoxide resin and a polyene and the other part containing a curing agent and a polymercaptan.

33. A pack as claimed in claim 32, wherein the polymercaptan contains no carboxylic ester groups.

34. A three-part pack, the contents of which, on mixing, provide a composition as claimed in claim 1, one part containing an epoxide resin and a polyene, a second part containing a polymercaptan, and the third part containing a curing agent.

35. A method for bonding surfaces together which comprises sandwiching between, and in contact with, the surfaces a composition as claimed in claim 1 and curing the composition.

* * * * *